Nov. 27, 1923.  1,475,434

W. E. KERSHAW ET AL

SECONDARY OR STORAGE BATTERY

Filed Dec. 29, 1920

INVENTOR
Charles D. Galloway and
William Ernest Kershaw
BY
Augustus B. Singleton
ATTORNEY.

WITNESS:

Patented Nov. 27, 1923.

1,475,434

UNITED STATES PATENT OFFICE.

WILLIAM ERNEST KERSHAW AND CHARLES D. GALLOWAY, OF PHILADELPHIA, PENNSYLVANIA.

SECONDARY OR STORAGE BATTERY.

Application filed December 29, 1920. Serial No. 433,848.

*To all whom it may concern:*

Be it known that we, WILLIAM ERNEST KERSHAW and CHARLES D. GALLOWAY, citizens of the United States, residing at Philadelphia, in the county of Philadelphia and State of Pennsylvania, have jointly invented certain new and useful Improvements in Secondary or Storage Batteries, of which the following is a specification.

As a practical matter and in spite of suggested remedies in the manufacture and use of secondary or storage batteries, and more especially in the forming or charging, acid fumes or vapors are given or carried off by or with the evolved gases, and when the batteries are located in confined spaces such as forming shops, battery houses, rooms or stations, the atmosphere becomes contaminated by these acid fumes or vapors, to such an extent as to amount to an annoyance, not to health, but to comfort and property, requiring the protection of metal and other parts attackable by the acid, alkali or other corrosive compounds of the electrolyte.

The principal object of the present invention is to successfully and permanently overcome the above mentioned defects and disadvantages without in any way interfering with the operation, use or treatment of the battery or of its plates or electrodes.

To this and other ends hereinafter set forth the invention, stated in general terms, comprises a foraminous covering layer of a comminuted solid, of which gilsonite is an example, chemically and electrically inert or passive under battery conditions and floatable, independent of entrained or occluded air, upon the electrolyte, and adapted to control the escape of gases in such a way as to induce the formation of bubbles of such size or character that in bursting the escaping gases do not carry fine particles of electrolyte as spray, vapor or fine mist into the atmosphere, but the electrolyte is retained in, or falls back into, the battery; and further the invention comprises the improvements to be presently described and finally claimed.

In the following description reference will be made to the accompanying drawings forming part hereof and in which—

Figure 1:
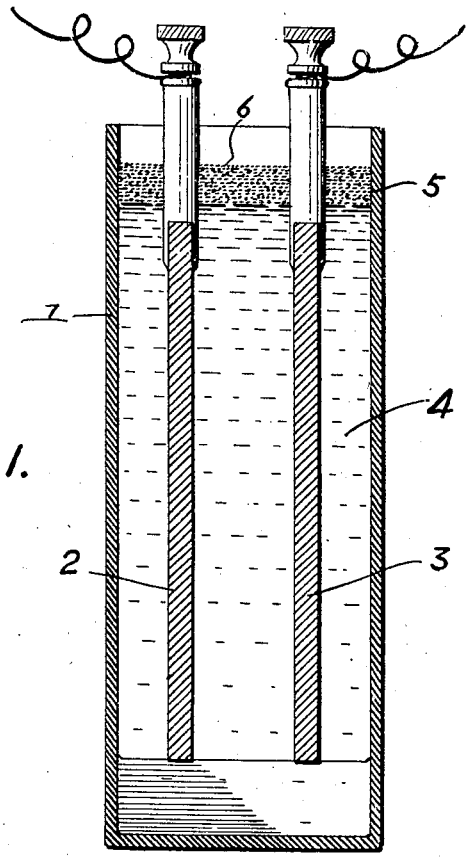
Figure 1 is a view, principally in central section, of a conventional cell showing the covering.

In the drawings 1 is a jar or container, 2 and 3 are the plates or electrodes, which, as an example, may be lead or leaden, and 4 is the electrolyte, as of water acidulated with acid of which sulphuric acid is the best known example. There is nothing new or important about these parts and they are some of the ordinary and usual provisions of a secondary or storage battery of the kind that evolves or gives off gases, as hydrogen and oxygen, upon the passage of current between its plates and through the electrolyte.

Figure 2:
Figs. 2 and 3 are perspective views, drawn to an enlarged scale and showing examples of the particles of which the covering may be made.
Figure 3:
Figure 4:
Fig. 4, is a diagrammatic or schematic view illustrative of the covering.

5 is a foraminous covering layer of solid portions 6, chemically, electro-chemically, and electrically inert or passive under battery conditions and floatable, independent of entrained or occluded air, upon the electrolyte 4. The particles 6 may be in the form of powder which is intended to be illustrated in Fig. 1, or in the form of flakes, regular in form as in Fig. 2, or irregular in form as in Fig. 3. The point is that the invention is not limited as to the mere matter of form. The material or substance employed should not only possess the properties mentioned, but also possess the property of easy detachment from the plates or electrodes when removed from the jar or container. Comminuted gilsonite possesses the required properties and characteristics and is an example of the kind of material employed, but inasmuch as the invention is both chemical, electrical, and electro-chemical in its nature, the broad doctrine of equivalents allowed in such cases is claimed.

The mode of operation of a battery equipped with a covering embodying the invention may be explained as follows: The coating permanently floats upon the electrolyte, because it is floatable independently of occluded or entrained air, and by reason of specific gravity in respect to the specific gravity of the electrolyte. Moreover its particles are solid and therefore do not adhere as a film or otherwise to the plates or electrodes when they are put in or taken out of the electrolyte. The covering is inert or passive under battery conditions, chemical, electro-chemical, or electrical, and it performs its function of avoiding contamination of the atmosphere with acid fumes or vapors mechanically or physically in a way that may be sufficiently described as follows, although others may prefer to describe it differently. The particles of the coating, which may descriptively, and not by way of limitation be said to be one-half inch thick, more or less, while providing between and around them passages for the escape of the evolved gases, compels the formation of the latter into comparatively large bubbles, as distinguished from such small bubbles as would on bursting and if unrestrained by the covering, throw electrolyte into the air in the form of a spray, fine mist or vapor, which remaining in the air, contaminates the atmosphere, and these large bubbles when they burst give off electrolyte in such quantity that it does not escape through the covering or if it does it falls back onto the same or into the container without contaminating the atmosphere or remaining in the air in the form of vapor, mist or fog. Descriptively, and not by way of limitation, the particles may be one sixty-fourth of a square inch in area and may be of the thickness of blotting paper, or they may be in the form of powder. Of course a lid or cover may be applied to the cell.

That modifications may be made in details without departing from the spirit of the invention will be obvious to those skilled in the art and therefore the invention is not limited to such matters or otherwise than as the prior art and the appended claims may require.

We claim:

1. A secondary or storage battery provided with a foraminous covering layer of a comminuted solid chemically and electrically inert or passive under battery conditions and floatable independently of entrained or occluded air upon the electrolyte, substantially as described.

2. A secondary or storage battery having its electrolyte provided with a covering layer of comminuted gilsonite, substantially as described.

3. A secondary or storage battery having its electrolyte provided with a covering layer of flaked gilsonite, substantially as described.

4. In a storage battery the combination with the electrolyte of comminuted gilsonite, substantially as described.

5. As a means for preventing the escape of sulphuric acid from the electrolyte of a charging battery comminuted gilsonite adapted to float in the electrolyte.

6. As a means for preventing the escape of gassing electrolyte from a secondary or storage battery into the air comminuted solid inert material permanently floatable at the top of the electrolyte, substantially as described.

7. In a secondary or storage battery the combination with the electrolyte of particles of solid hydrocarbon floatable in the electrolyte, substantially as described.

WILLIAM ERNEST KERSHAW.
CHARLES D. GALLOWAY.